(12) United States Patent
Ahn et al.

(10) Patent No.: US 9,671,653 B2
(45) Date of Patent: Jun. 6, 2017

(54) DISPLAY DEVICE

(71) Applicant: Samsung Display Co., Ltd., Yongin-si, Gyeonggi-Do (KR)

(72) Inventors: Byeongjae Ahn, Asan-si (KR); Minhee Son, Anyang-si (KR); Juhyeon Baek, Asan-si (KR); Bongjun Lee, Seoul (KR); Jiyoung Jeong, Cheonan-si (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 0 days.

(21) Appl. No.: 14/789,050

(22) Filed: Jul. 1, 2015

(65) Prior Publication Data

US 2016/0161789 A1     Jun. 9, 2016

(30) Foreign Application Priority Data

Dec. 8, 2014   (KR) .................. 10-2014-0175112

(51) Int. Cl.
    *G02F 1/1339* (2006.01)
    *G02F 1/1335* (2006.01)

(52) U.S. Cl.
    CPC .... *G02F 1/13394* (2013.01); *G02F 1/133512* (2013.01); *G02F 2001/13396* (2013.01); *G02F 2001/13398* (2013.01)

(58) Field of Classification Search
    CPC ............... G02F 1/13394; G02F 2001/13396
    See application file for complete search history.

(56) References Cited

U.S. PATENT DOCUMENTS

| | | | |
|---|---|---|---|
| 5,815,232 A * | 9/1998 | Miyazaki | G02F 1/133514 349/106 |
| 6,498,375 B2 | 12/2002 | Dennison | |
| 7,492,437 B2 | 2/2009 | Moon et al. | |
| 8,529,855 B2 | 9/2013 | Chew | |
| 8,717,522 B2 | 5/2014 | Choi | |
| 2005/0185129 A1* | 8/2005 | Kim | G02F 1/13394 349/156 |
| 2007/0097311 A1* | 5/2007 | Li | G02F 1/133514 349/155 |
| 2009/0115954 A1* | 5/2009 | Tseng | G02F 1/13394 349/156 |
| 2009/0207371 A1* | 8/2009 | Yamamoto | G02F 1/13394 349/156 |

(Continued)

FOREIGN PATENT DOCUMENTS

| | | |
|---|---|---|
| JP | 2009-252642 A | 10/2009 |
| KR | 1992-0002633 A | 2/1992 |

(Continued)

*Primary Examiner* — Phu Vu
(74) *Attorney, Agent, or Firm* — Robert E. Bushnell, Esq.

(57) ABSTRACT

A display device includes: a first substrate; a second substrate disposed to oppose the first substrate; a light shielding portion disposed on the first or second substrate and defining a plurality of pixel areas; and a spacer disposed on the light shielding portion between vertically adjacent pixel areas; wherein the spacer has a first interval apart from an upper pixel area and a second interval apart from a lower pixel area from among the vertically adjacent pixel areas, and the first interval differs from the second interval in upper and lower portions of the first or second substrate.

20 Claims, 11 Drawing Sheets

(56) References Cited

U.S. PATENT DOCUMENTS

| | | | | |
|---|---|---|---|---|
| 2009/0213316 A1* | 8/2009 | Yoshida | ............... | G02F 1/13394 349/155 |
| 2009/0322996 A1* | 12/2009 | Dong | ................. | G02F 1/13394 349/106 |
| 2010/0118254 A1* | 5/2010 | Hashimoto | ......... | G02F 1/13394 349/155 |
| 2012/0013001 A1 | 1/2012 | Haba | | |
| 2012/0113347 A1* | 5/2012 | Shim | ................... | G02F 1/13394 349/43 |
| 2012/0133853 A1* | 5/2012 | Ito | ..................... | G02F 1/136213 349/38 |
| 2013/0338289 A1 | 12/2013 | Jadot et al. | | |

FOREIGN PATENT DOCUMENTS

| | | |
|---|---|---|
| KR | 1999-0082204 A | 11/1999 |
| KR | 2001-0042486 A | 5/2001 |
| KR | 2002-0048666 A | 6/2002 |
| KR | 10-2005-0002410 A | 1/2005 |
| KR | 10-2005-0119784 A | 12/2005 |
| KR | 10-2006-0133380 A | 12/2006 |
| KR | 10-2006-0133381 A | 12/2006 |
| KR | 10-2007-0002371 A | 1/2007 |
| KR | 10-2008-0058908 A | 6/2008 |
| KR | 10-2008-0059849 A | 7/2008 |
| KR | 10-2011-0123044 A | 11/2011 |
| KR | 10-2012-0124070 A | 11/2012 |
| KR | 10-2013-0034744 A | 4/2013 |
| KR | 10-2013-0048626 A | 5/2013 |
| KR | 10-2013-0086347 A | 8/2013 |
| KR | 10-2014-0007863 A | 1/2014 |

* cited by examiner

DISPLAY DEVICE

CLAIM OF PRIORITY

This application claims the priority to and all the benefits accruing under 35 U.S.C. 119 of Korean Patent Application No. 10-2014-0175112, filed on Dec. 8, 2014, with the Korean Intellectual Property Office (KIPO), the disclosure of which is incorporated herein in its entirety by reference.

BACKGROUND OF THE INVENTION

1. Field of Disclosure

Embodiments of the present invention relate to a display device, and more particularly, to a display device preventing light leakage caused by a spacer.

2. Description of the Related Art

A liquid crystal display (LCD) is a type of flat panel displays (FPDs), which is most widely used these days. An LCD includes two substrates including electrodes formed thereon and a liquid crystal layer interposed therebetween. Upon voltages being applied to two electrodes in the LCD, liquid crystal molecules of the liquid crystal layer are rearranged, and thereby an amount of transmitted light is adjusted.

Such an LCD further includes a spacer between two substrates in order to maintain an interval therebetween and have durability against external impacts.

In a case of external impacts being applied to the LCD, an alignment film provided adjacently to the spacer may be scratched due to movement of the spacer. Such a damaged alignment film due to scratches may not control liquid crystal molecules, and accordingly, light leakage may occur in a damaged portion of the alignment film. In particular, movement of the spacer due to external impacts may occur in different directions based on a position of the substrate.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY OF THE INVENTION

Aspects of embodiments of the present invention are directed to a display device preventing light leakage caused by a spacer.

According to an exemplary embodiment of the present invention, a display device includes: a first substrate; a second substrate disposed to oppose the first substrate; a light shielding portion disposed on the first or second substrate and defining a plurality of pixel areas; and a spacer disposed on the light shielding portion between vertically adjacent pixel areas; wherein the spacer has a first interval apart from an upper pixel area and a second interval apart from a lower pixel area from among the vertically adjacent pixel areas, and the first interval differs from the second interval in upper and lower portions of the first or second substrate.

The first interval may be greater than the second interval in the lower portion of the first or second substrate.

The first interval may increase from a central portion of the first or second substrate to the lower portion of the first or second substrate.

The second interval may be greater than the first interval in the lower portion of the first or second substrate.

The second interval may increase from the central portion of the first or second substrate to the upper portion of the first or second substrate.

The first interval may be the same as the second interval in the central portion of the first or second substrate.

A sum of the first and second intervals may be substantially the same in the central, upper, and lower portions of the first or second substrate.

The light shielding portion may be a black matrix.

The spacer may be disposed on the first or second substrate and protrudes toward one of the first and second substrates that faces the spacer.

The spacer may include a first spacer in contact with one of the first and second substrates that faces the spacer and a second spacer spaced apart from one of the first and second substrates that faces the spacer.

The first spacer may have a height different from a height of the second spacer.

The first spacer may have a height lower than a height of the second spacer.

The first spacer may have upper and lower surfaces greater than upper and lower surfaces of the second spacer.

The upper and lower surfaces of the first and second spacers may have a circular shape.

The display device may further include a pixel electrode disposed on the first substrate; a common electrode disposed on the first or second substrate; and a liquid crystal layer interposed between the first and second substrates.

A portion of the pixel electrode may be disposed in the pixel area and another portion of the pixel electrode may be disposed to overlap the light shielding portion.

The portion of the pixel electrode disposed in the pixel area may be greater than the portion of the pixel electrode overlapping the light shielding portion.

At least a portion of the common electrode may overlap the pixel electrode.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
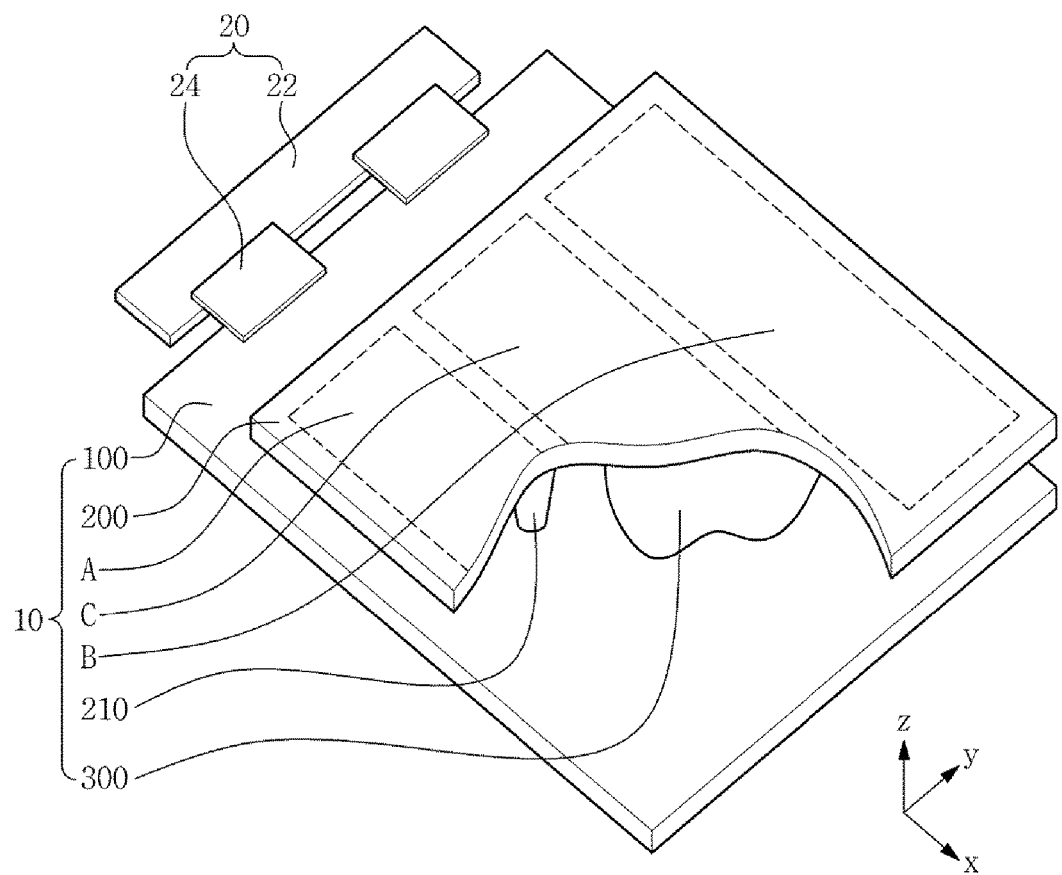
FIG. 1 is an exploded perspective view illustrating a display device according to an exemplary embodiment of the present invention.

Advantages and features of the present invention and methods for achieving them will be made clear from embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is merely defined by the scope of the claims. Therefore, well-known constituent elements, operations and techniques are not described in detail in the embodiments in order to prevent the present invention from being obscurely interpreted. Like reference numerals refer to like elements throughout the specification.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

FIG. 1 is an exploded perspective view illustrating a display device according to an exemplary embodiment of the present invention.

Referring to FIG. 1, a display device according to an exemplary embodiment of the present invention may include a display panel 10 displaying an image and a drive unit 20 driving the display panel 10.

The display panel 10 may include a first substrate 100, a second substrate 200 disposed to oppose the first substrate 100, and a liquid crystal layer 300 interposed between the first and second substrates 100 and 200.

Although the display panel 10 is provided as a liquid display panel in the exemplary embodiment of the present invention, the display panel 10 is not limited thereto, and may be modified in various manners including a display panel using an organic light emitting diode (OLED), or the like.

The first substrate 100 may be formed of transparent glass, plastic, or the like, and may have a planar shape or a curved shape (not shown) having a predetermined radius of curvature.

Although not illustrated in FIG. 1, a gate line and a data line may be disposed on the first substrate 100 through while being insulated from one another and alternately arranged.

The gate line (not illustrated) may be disposed on the first substrate 100 in a first direction of the first substrate 100. The gate line may be formed of an aluminum (Al) based metal such as Al or an Al alloy, a silver (Ag) based metal such as Ag or an Ag alloy, a copper (Cu) based metal such as Cu or a Cu alloy, a molybdenum (Mo) based metal such as Mo or a Mo alloy, chromium (Cr), tantalum (Ta), and titanium (Ti); however, the material forming the gate line is not limited thereto, and the gate line may have a multilayer structure including at least two conductive films having different physical properties.

The data line (not illustrated) may be disposed on the first substrate 100 in a second direction of the first substrate 100 to be arranged alternately with the gate line. The data line may be formed of a refractory metal such as Mo, Cr, Ta, and Ti or an alloy thereof; however, the material forming the data line is not limited thereto, and the data line may have a multilayer structure including a refractory metal film and a low resistance conductive film.

The second substrate 200 may be disposed to oppose the first substrate 100, and may be formed of transparent glass, plastic, or the like. The second substrate 200 may have a planar shape or a curved shape (not shown) having a radius of curvature smaller than that of the first substrate 100.

The spacer 210 may maintain a gap between the first and second substrates 100 and 200, and may serve to mitigate external impacts transferred to the display panel 10.

The spacer 210 may be disposed on the second substrate 200 and may protrude toward the first substrate 100. However, the disposition of the spacer 210 is not limited thereto, and the spacer 210 may be disposed on the first substrate 100 and may protrude toward the second substrate 200.

The spacer 210 may have a conical shape with a flat top, including circular top and bottom surfaces. However, the shape of the spacer 210 is not limited thereto, and the spacer 210 may be appropriately modified to have various shapes such as a quadrangular pyramid, an elliptical cone, and a triangular pyramid, having respective flat tops.

The drive unit 20 may include a printed circuit board (PCB) 22 and a tape carrier package (TCP) 24. Although not illustrated in FIG. 1, the drive unit 20 may further include a timing controller, a gate driver, and a data driver.

The timing controller (not illustrated) may generate a gate control signal and a data control signal based on an externally received control signal. The timing controller may output the gate control signal to the gate driver, and may output the data control signal to the data driver. In addition, the timing controller may output a corrected image signal to the data driver based on an externally received image signal.

The gate driver (not illustrated) may receive the gate control signal supplied thereto to generate a gate signal, and may output the gate signal to a gate line. The gate driver may be mounted on the PCB 22, or may be directly mounted on the display panel 10.

The data diver (not illustrated) may receive the data control signal and the corrected image signal supplied thereto to generate a data voltage, and may output the data voltage to a data line. The data driver may be mounted on the TCP 24 to thereby have a form of a chip.

The liquid crystal layer 300 may be interposed between the first and second substrates 100 and 200. The liquid crystal layer 300 may include a photopolymerization material, and such a photopolymerization material may be a reactive monomer or a reactive mesogen.

Figure 2:
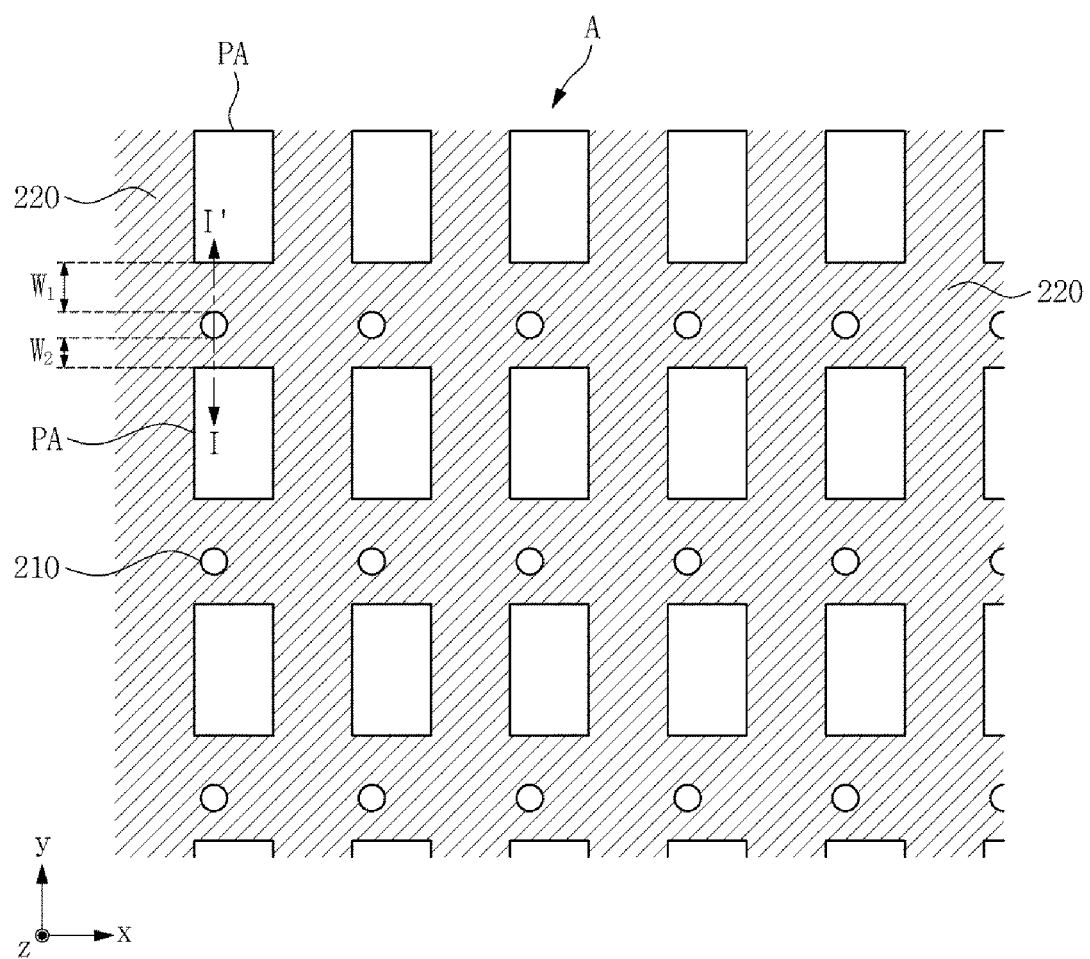
FIG. 2 is a plan view illustrating a pixel area disposed in lower portion A of a display panel of FIG. 1 according to an exemplary embodiment of the present invention.
Figure 3:
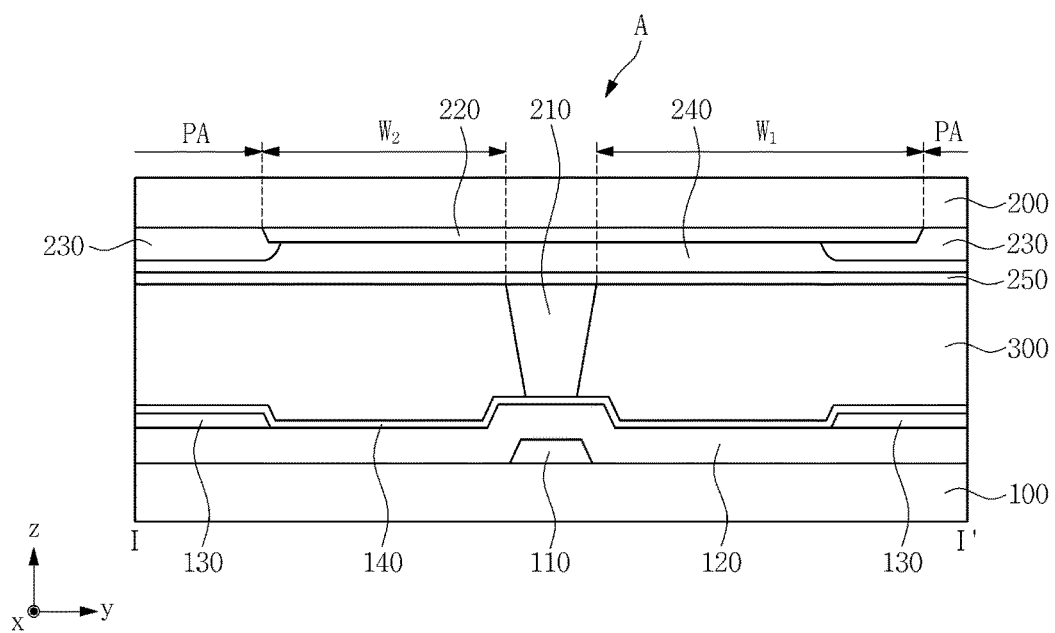
FIG. 3 is a cross-sectional view taken along line I-I' of FIG. 2.
Figure 4:
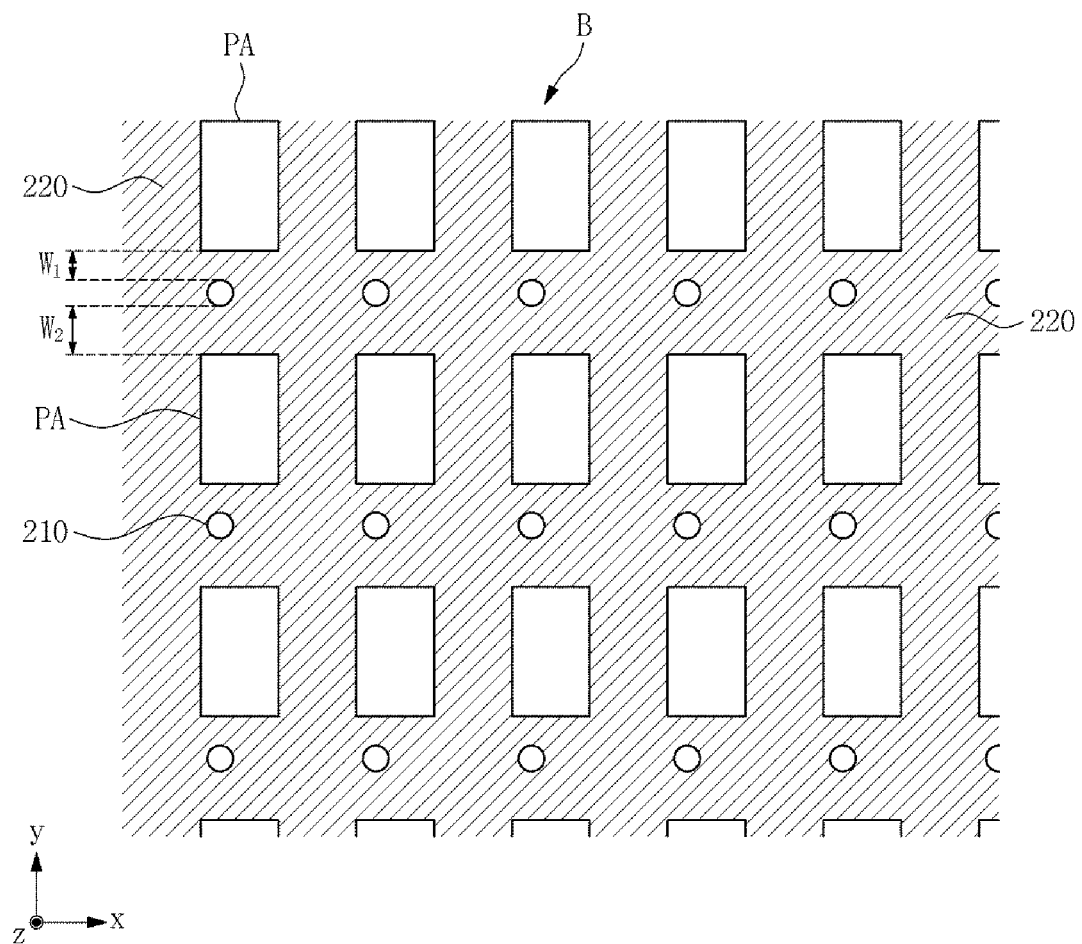
FIG. 4 is a plan view illustrating a pixel area disposed in upper portion B of the display panel of FIG. 1 according to an exemplary embodiment of the present invention.

FIG. 2 is a plan view illustrating a pixel area disposed in lower portion A of a display panel of FIG. 1 according to an exemplary embodiment of the present invention; FIG. 3 is a cross-sectional view taken along line I-I' of FIG. 2; FIG. 4 is a plan view illustrating a pixel area disposed in upper portion B of the display panel of FIG. 1 according to an exemplary embodiment of the present invention; and FIG. 5 is a plan view illustrating a pixel area disposed in central portion C of the display panel of FIG. 1 according to an exemplary embodiment of the present invention.

Figure 5:
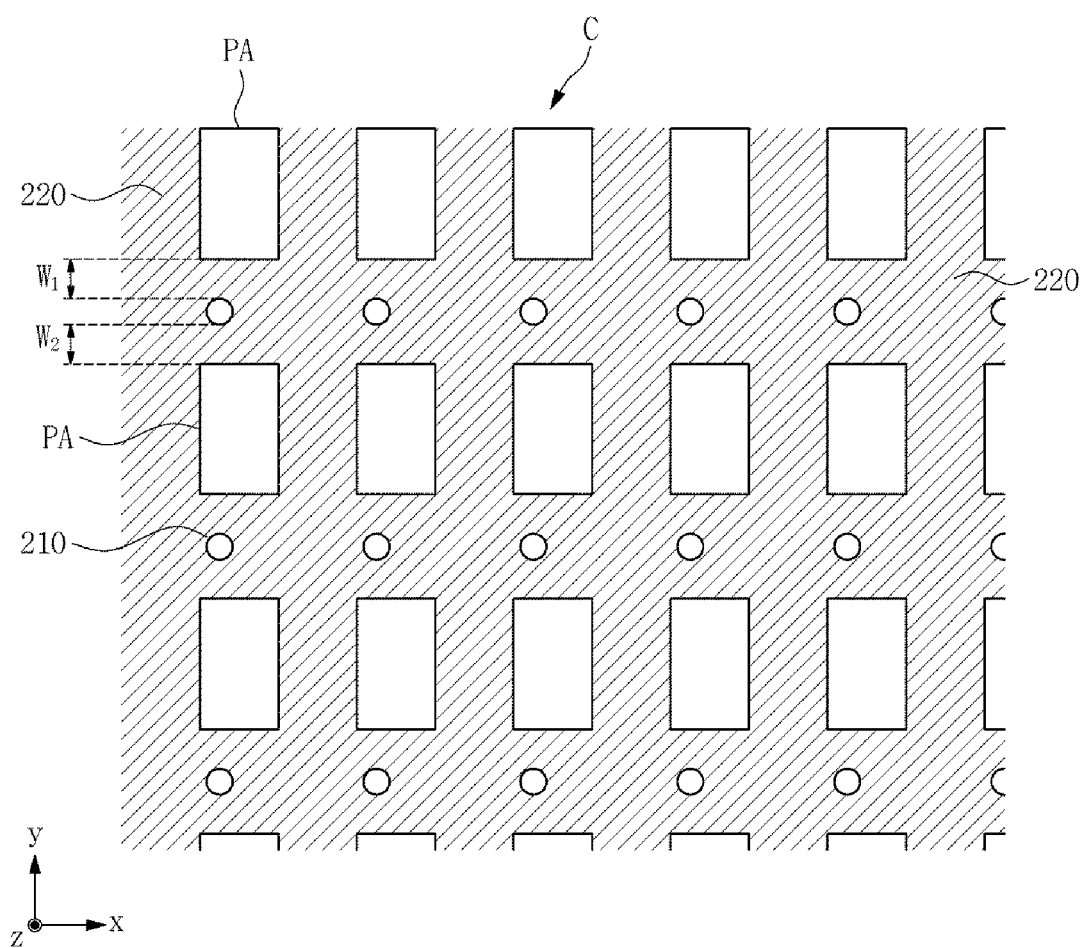
FIG. 5 is a plan view illustrating a pixel area disposed in central portion C of the display panel of FIG. 1 according to an exemplary embodiment of the present invention.

Referring to FIGS. 2, 4, and 5, the display device according to the exemplary embodiment of the present invention may include a plurality of pixel areas PA defined by a light shielding portion 220.

The light shielding portion 220 may be disposed to overlap a gate line (not illustrated) and a data line (not illustrated) disposed on the first substrate 100 to define a pixel area PA having a quadrangular shape.

The spacer 210 may be disposed on the light shielding portion 220 between vertically adjacent pixel areas PA, and may have a first interval W1 apart from an upper pixel area PA and a second interval W2 apart from a lower pixel area PA from among the vertically adjacent pixel areas PA.

A description of the first interval W1 and the second interval W2 will be provided in detail later.

Referring to FIG. 3, a gate electrode 110, a gate insulating film 120, a pixel electrode 130, and an alignment film 140 may be sequentially disposed on the first substrate 100, and the light shielding portion 220, a color filter 230, a planarization layer 240, a common electrode 250, and the spacer 210 may be sequentially disposed on the second substrate 200.

The gate electrode 110 may extend from a gate line (not illustrated). Although not illustrated in FIG. 3, a source electrode connected to a data line (not illustrated), a drain electrode connected to the pixel electrode 130, and a semiconductor layer may be disposed on the gate electrode 110. The gate electrode 110, the source electrode (not illustrated), the drain electrode (not illustrated), and the semiconductor layer (not illustrated) may configure a thin film transistor (TFT).

The gate electrode 110 may be insulated from the source electrode (not illustrated) and the drain electrode (not illustrated) by the gate insulating film 120, and the semiconductor layer (not illustrated) may be disposed between the gate insulating film 120 and the source electrode (not illustrated) and between the gate insulating film 120 and the drain electrode (not illustrated).

The pixel electrode 130 may be formed of a material having optical transparency and electrical conductivity such as indium tin oxide (ITO) or indium zinc oxide (IZO).

The pixel electrode 130 may be provided in a form of a branch electrode extending from a stem electrode in a criss-cross pattern including a horizontal stem electrode and a vertical stem electrode in four different directions of the stem electrode. However, the form of the pixel electrode 130 may be provided in various manners, and the scope of the present invention is not limited thereby.

A portion of the pixel electrode 130 may be disposed in the pixel area PA, and another portion of the pixel electrode 130 may be disposed to overlap the light shielding portion 220. However, in particular, the portion of the pixel electrode 130 disposed in the pixel area PA may be greater than the portion of the pixel electrode 130 overlapping the light shielding portion 220.

The alignment film 140 may be disposed on the pixel electrode 130, and may serve to pretilt liquid crystal molecules of the liquid crystal layer 300. The alignment film 140 may be a vertical alignment film or a photoaligned alignment film including a photopolymerization material, and such a photopolymerization material may be a reactive monomer or a reactive mesogen. Although not illustrated in FIG. 3, the alignment film 140 may further be disposed on the common electrode 130.

The light shielding portion 220 may prevent the gate line (not illustrated), the data line (not illustrated), and the TFT (not illustrated) from being viewed externally, and may prevent light leakage caused by a parasitic capacitor formed around the gate line (not illustrated) and the data line (not illustrated).

The light shielding portion 220 may be a black matrix. Although the light shielding portion 220 is disposed on the second substrate 200 in the display device according to the exemplary embodiment of the present invention, the disposition of the light shielding portion 220 is not limited thereto, and the light shielding portion 220 may be disposed on the first substrate 100.

The color filter 230 may be disposed in the pixel area PA, and a portion of the color filter 230 may be disposed to overlap the light shielding portion 220.

The color filter 230 may display one of basic colors such as the three primary colors of red, green, and blue; however, the color displayed by the color filter 230 is not limited thereto, and the color filter 230 may display one of magenta, yellow, and white.

The color filters 230 may be arranged to have different colors in adjacent pixel areas PA, respectively. For example, the color filters 230 may be arranged in a sequence of red, green, and blue, or in a sequence of red, green, blue, and white. The arrangement of the color filters 230 may be provided in various manners, and the scope of the present invention is not limited thereby.

The planarization layer 240 may be disposed on the light shielding portion 220 and the color filter 230, and may serve to planarize the second substrate 200.

The common electrode 250 may be disposed on the planarization layer 240, and may be formed of a material having optical transparency and electrical conductivity in a manner similar to that of the pixel electrode 130.

The common electrode 250 may be disposed on the entirety of the second substrate 200 in a continuous single sheet of the common electrode; however, the disposition of the common electrode 250 is not limited thereto, and the common electrode 250 may have a predetermined pattern formed therein. Although the common electrode 250 is disposed on the second substrate 200 in the display device according to the exemplary embodiment of the present invention, the disposition of the common electrode 250 is not limited thereto, and the common electrode 250 may be disposed on the first substrate 100 and may be insulated from the pixel electrode 130.

Referring to FIG. 2, the first interval W1 may be greater than the second interval W2 in lower portion A of the second substrate 200. However, the length of the interval is not limited thereto, and in a case in which the spacer 210 is disposed on the first substrate 100, the first interval W1 may be greater than the second interval W2 in lower portion A of the first substrate 100.

That is, a width of the light shielding portion 220 disposed between the spacer 210 and the upper pixel area PA may be greater than a width of the light shielding portion 220 disposed between the spacer 210 and the lower pixel area PA. Accordingly, the light shielding portion 220 may have a width between the spacer 210 and the upper pixel area PA, increasing toward upper portion B of the second substrate 200.

In a case of external impacts being applied to the display device, the spacer 210 may move toward the upper pixel area PA in lower portion A of the second substrate 200, and the alignment film 140 disposed in the upper pixel area PA may be damaged due to the movement of the spacer 210. The display device according to the present exemplary embodiment may prevent such damage to the alignment film caused by movement of the spacer 210 by allowing the second interval W2 to be greater than the first interval W1 in lower portion A of the second substrate 200.

Referring to FIG. 4, the second interval W2 may be greater than the first interval W1 in upper portion B of the second substrate 200. However, the length of the interval is not limited thereto, and in the case in which the spacer 210 is disposed on the first substrate 100, the second interval W2 may be greater than the first interval W1 in upper portion B of the first substrate 100.

That is, a width of the light shielding portion 220 disposed between the spacer 210 and the lower pixel area PA may be greater than a width of the light shielding portion 220 disposed between the spacer 210 and the upper pixel area PA. Accordingly, the light shielding portion 220 may have a width between the spacer 210 and the lower pixel area PA, increasing toward lower portion A of the second substrate 200.

In the case of external impacts being applied to the display device, the spacer 210 may move toward the lower pixel area PA in upper portion B of the second substrate 200, and the alignment film 140 disposed in the lower pixel area PA may be damaged due to the movement of the spacer 210. The display device according to the present exemplary embodiment may prevent such damage to the alignment film caused by movement of the spacer 210 by allowing the second interval W2 to be greater than the first interval W1 in upper portion B of the second substrate 200.

Referring to FIG. 5, the first interval W1 may be the same as the second interval W2 in central portion C of the second substrate 200. However, the length of the interval is not limited thereto, and in the case in which the spacer 210 is disposed on the first substrate 100, the first interval W1 may be the same as the second interval W2 in central portion C of the first substrate 100.

That is, a width of the light shielding portion 220 disposed between the spacer 210 and the upper pixel area PA may be the same as a width of the light shielding portion 220 disposed between the spacer 210 and the lower pixel area PA.

In the case of external impacts being applied to the display device, the spacer 210 may not move toward the upper or lower pixel area PA, which is upwardly or downwardly adjacent to the spacer 210, in central portion C of the second substrate 200. However, in order to have the aperture ratio of the pixel area PA disposed in the upper, lower, and central pixel areas PA of the second substrate 200, a sum of the first interval W1 and the second interval W2 may be substantially the same in the upper, lower, and central pixel areas PA of the second substrate 200. Here, the expression of being substantially the same may include a case of having a slight difference due to a process error, and the like.

Figure 6:
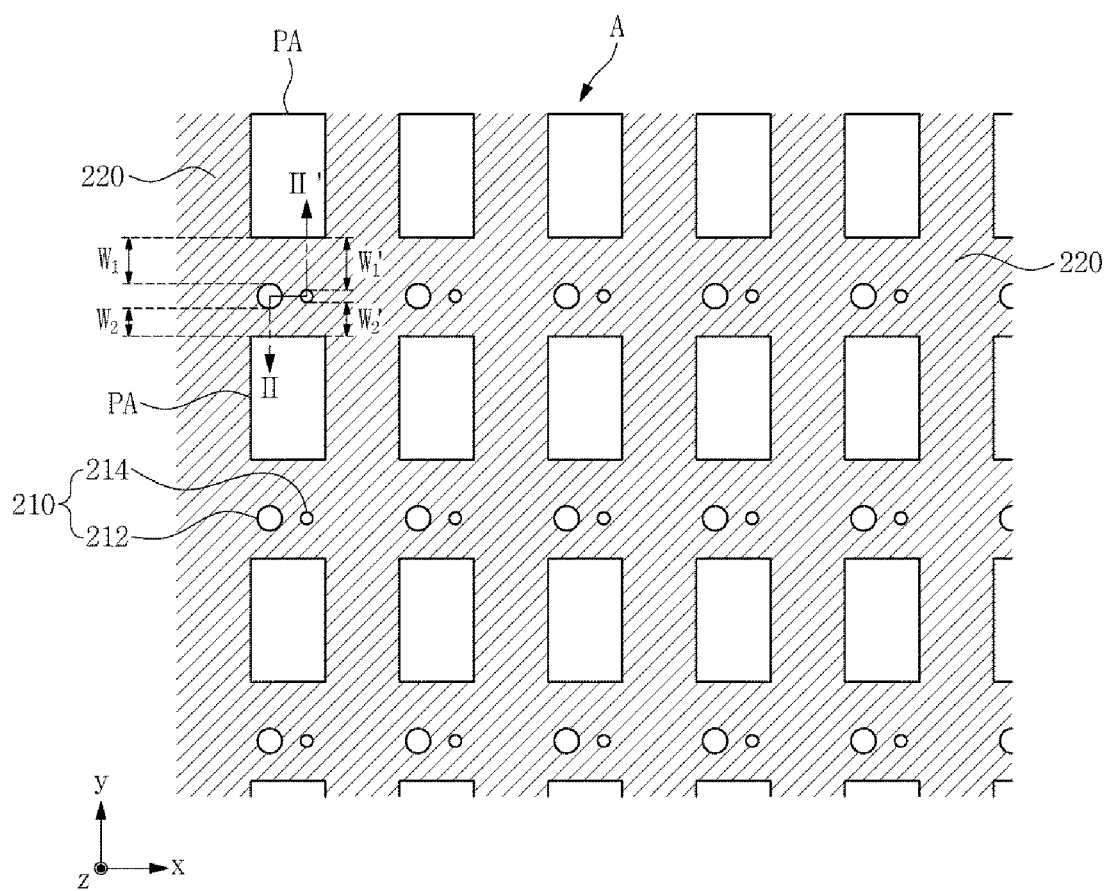
FIG. 6 is a plan view illustrating a pixel area disposed in lower portion A of the display panel of FIG. 1 according to another exemplary embodiment of the present invention.
Figure 7:
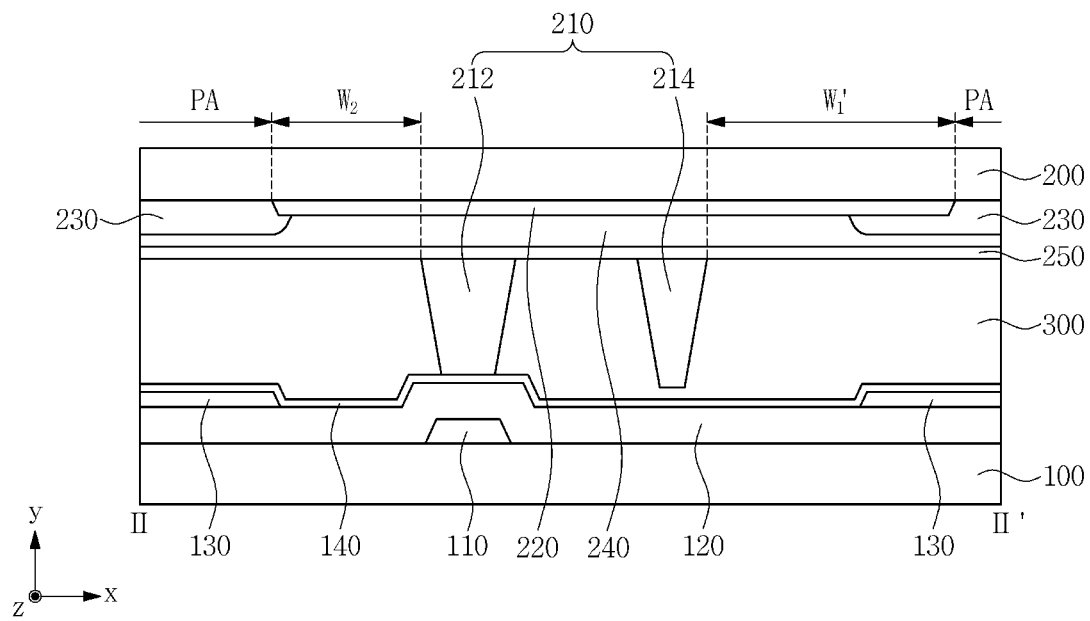
FIG. 7 is a cross-sectional view taken along line II-II' of FIG. 6.
Figure 8:
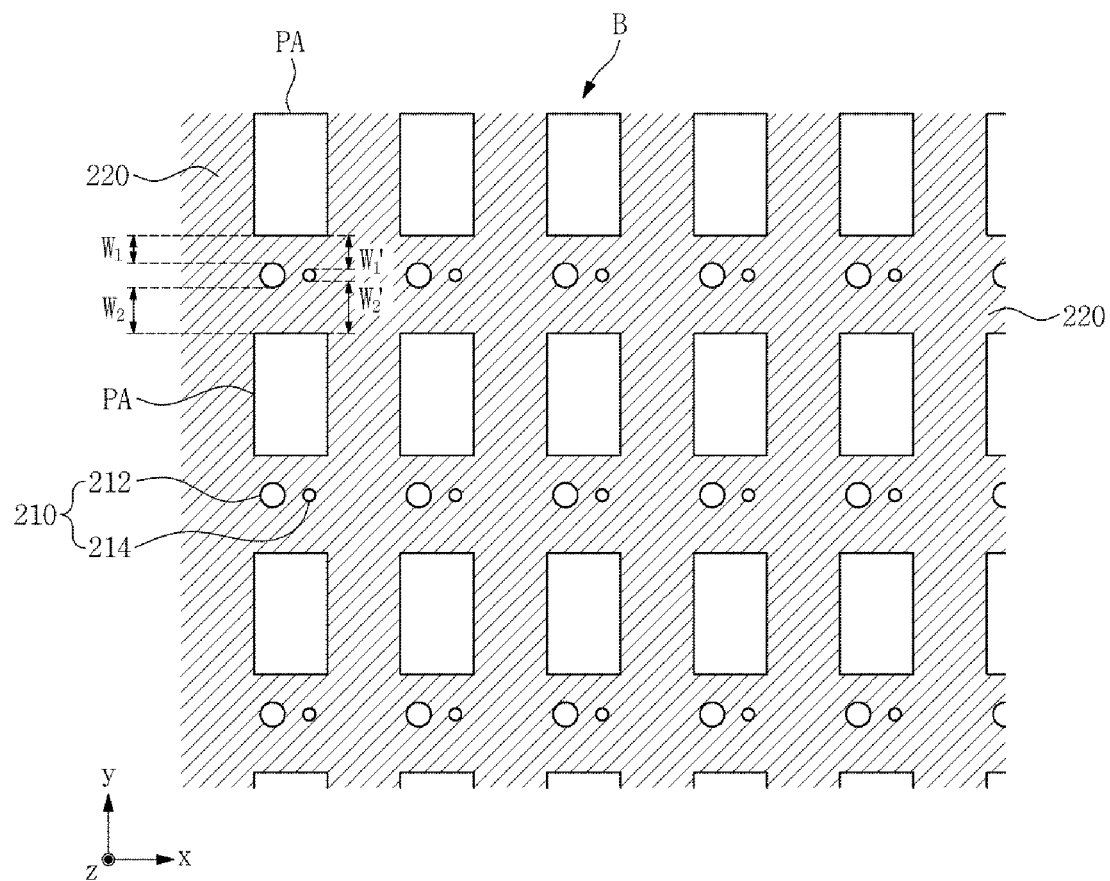
FIG. 8 is a plan view illustrating a pixel area disposed in upper portion B of the display panel of FIG. 1 according to another exemplary embodiment of the present invention.
Figure 9:
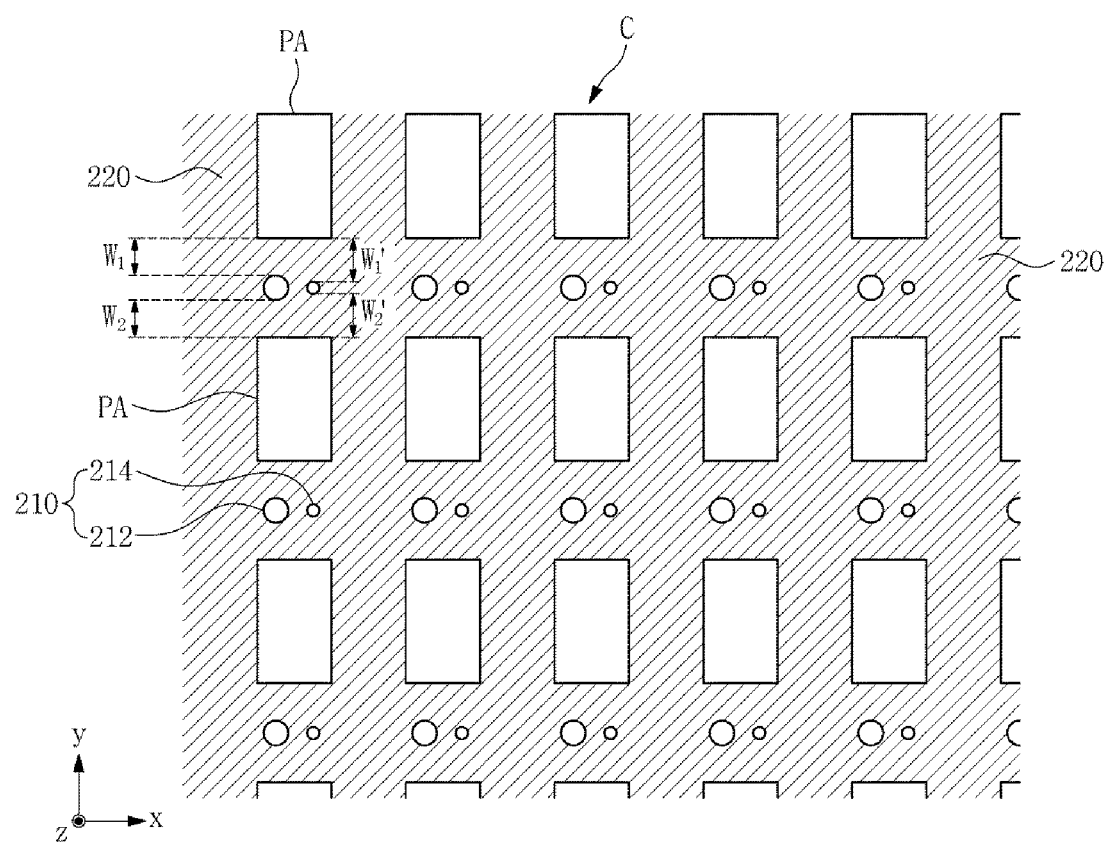
FIG. 9 is a plan view illustrating a pixel area disposed in central portion C of the display panel of FIG. 1 according to another exemplary embodiment of the present invention.

FIG. 6 is a plan view illustrating a pixel area disposed in lower portion A of the display panel of FIG. 1 according to another exemplary embodiment of the present invention; FIG. 7 is a cross-sectional view taken along line II-II' of FIG. 6; FIG. 8 is a plan view illustrating a pixel area disposed in upper portion B of the display panel of FIG. 1 according to another exemplary embodiment of the present invention; and FIG. 9 is a plan view illustrating a pixel area disposed in central portion C of the display panel of FIG. 1 according to another exemplary embodiment of the present invention.

Since a display device of FIGS. 6 through 9 is configured in the same manner as that of FIGS. 2 through 5, aside from the spacer 210, a repeated description thereof will be omitted for conciseness.

Referring to FIGS. 6 and 7, the spacer 210 may include a first spacer 212 and a second spacer 214. The number of spacers between two vertically adjacent pixel areas (PA) is not limited thereto, and the spacers can be more than two spacers.

The first spacer 212 may be disposed on the second substrate 200 to protrude toward the first substrate 100, and may be in contact with a surface of a plurality of thin films including the gate electrode 110 disposed on the first substrate 100. The second spacer 214 may be disposed on the second substrate 200 to protrude toward the first substrate 100, and may be spaced apart from the surface of the plurality of thin films disposed on the first substrate 100. Accordingly, the first spacer 212 may be in contact with the first substrate 100, and the second spacer 214 may be spaced apart from the first substrate 100.

The first spacer 212 may have a height different from that of the second spacer 214, and in particular, the first spacer 212 may have a height lower than that of the second spacer 214. However, the height of the spacer is not limited thereto, and the first spacer 212 and the second spacer 214 may have the same height as one another.

In detail, the first spacer 212 may have upper and lower surfaces greater than those of the second spacer 214, and in this instance, the upper and lower surfaces of the first spacer 212 may have a circular shape. However, the shape of the first spacer 212 is not limited thereto; the first spacer 212 may have the upper and lower surfaces the same as those of the second spacer 214 and the upper and lower surfaces of the first spacer 212 may have various shapes such as triangular, elliptical, quadrangular shapes.

Referring to FIGS. 6, 8, and 9, the first and second spacers 212 and 214 may have first intervals W1 and W1' apart from a pixel area PA disposed upwardly of the first and second spacers 212 and 214, respectively, and may have second intervals W2 and W2' apart from a pixel area PA disposed downwardly of the first and second spacers 212 and 214, respectively.

Since a description pertaining to the first intervals W1 and W1' and the second intervals W2 and W2' is the same as that provided with reference to FIGS. 2, 4, and 5, a repeated description thereof will be omitted.

Figure 10:
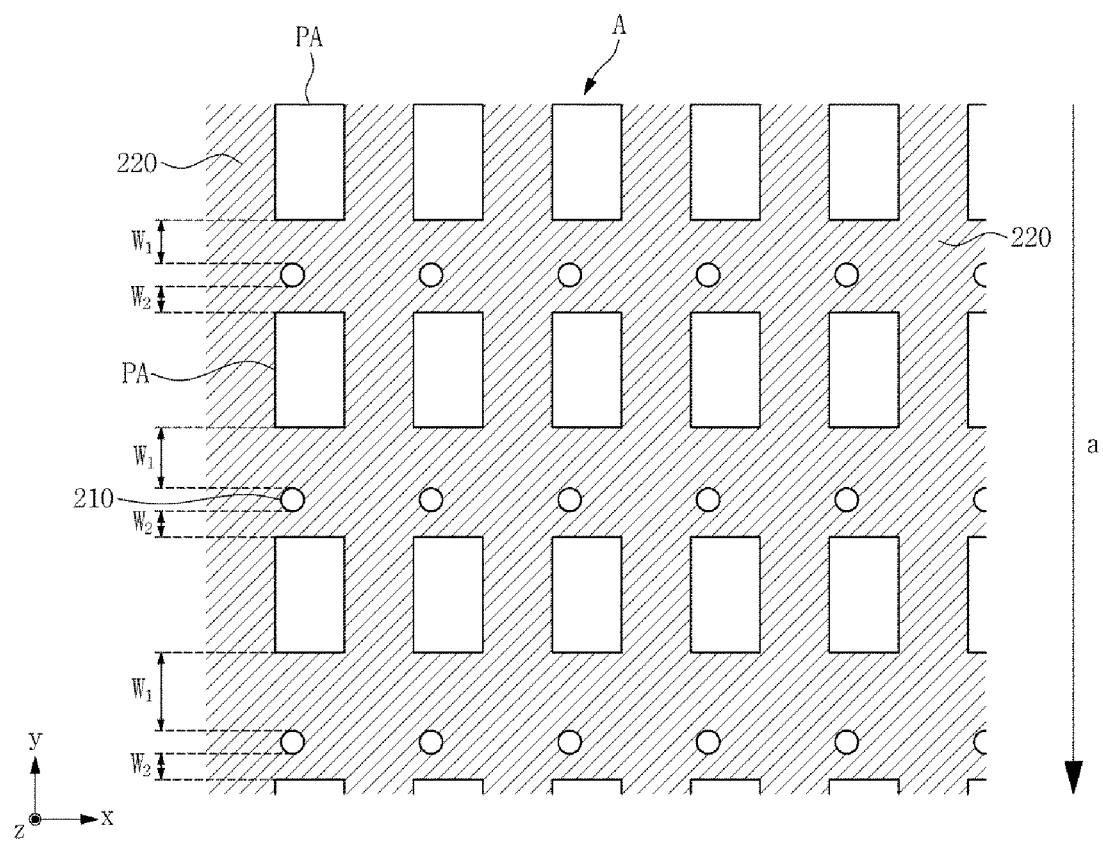
FIG. 10 is a plan view illustrating a pixel area disposed in lower portion A of the display panel of FIG. 1 according to another exemplary embodiment of the present invention.
Figure 11:
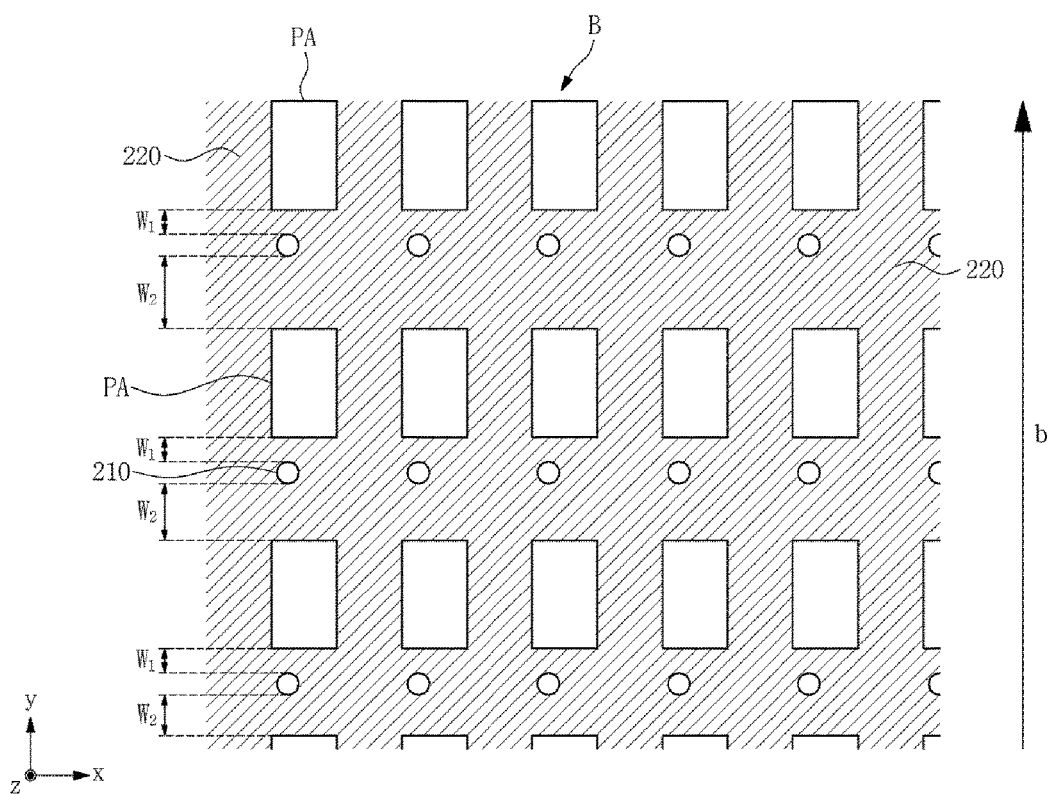
FIG. 11 is a plan view illustrating a pixel area disposed in upper portion B of the display panel of FIG. 1 according to another exemplary embodiment of the present invention.

FIG. 10 is a plan view illustrating a pixel area disposed in lower portion A of the display panel of FIG. 1 according to another exemplary embodiment of the present invention; FIG. 11 is a plan view illustrating a pixel area disposed in upper portion B of the display panel of FIG. 1 according to another exemplary embodiment of the present invention; and FIG. 12 is a plan view illustrating a pixel area disposed in central portion C of the display panel of FIG. 1 according to another exemplary embodiment of the present invention.

Figure 12:
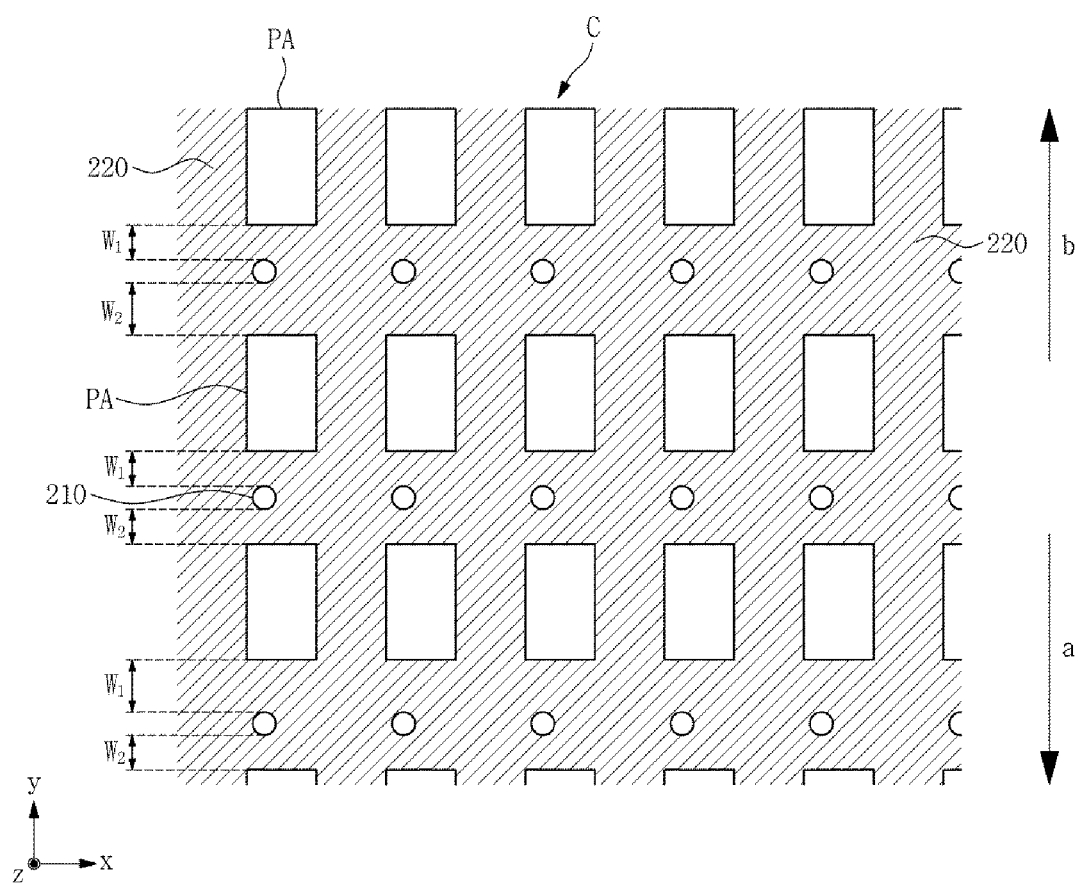
FIG. 12 is a plan view illustrating a pixel area disposed in central portion C of the display panel of FIG. 1 according to another exemplary embodiment of the present invention.

Since a display device of FIGS. 10 through 12 is configured in the same manner as that of FIGS. 2 through 5, aside from the first interval W1 between the spacer 210 and the upper pixel area PA and the second intervals W2 between the spacer 210 and the lower pixel area PA, a repeated description thereof will be omitted for conciseness.

Referring to FIGS. 10 and 12, the first interval W1 may increase from central portion C of the second substrate 200 toward lower portion A of the second substrate 200, for example, in "a" direction with reference to FIGS. 10 and 12. In particular, the first interval W1 may gradually increase from central portion C of the second substrate 200 toward lower portion A of the second substrate 200, that is, in "a" direction. However, the second interval W2 may be the same in central and lower portions C and A of the second substrate 200.

Referring to FIGS. 11 and 12, the second interval W2 may increase from central portion C of the second substrate 200 toward upper portion B of the second substrate 200, for example, in "b" direction with reference to FIGS. 11 and 12. In particular, the second interval W2 may gradually increase from central portion C of the second substrate 200 toward upper portion B of the second substrate 200, that is, in "b" direction. However, the first interval W1 may be the same in central and upper portions C and B of the second substrate 200.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings. Various features of the above described and other embodiments can be mixed and matched in any manner, to produce further embodiments consistent with the invention.

What is claimed is:

1. A display device comprising:
a first substrate;
a second substrate disposed to oppose the first substrate;
a light shielding portion disposed on one of the first and second substrates and defining first, second and third pixel areas adjacent to each other in the first direction sequentially; and
a first spacer disposed on the light shielding portion between the first pixel area and the second pixel area;
a second spacer disposed on the light shielding portion between the second pixel area and the third pixel area;
wherein the first spacer is spaced apart from the first pixel area by a first interval and from the second pixel area by a second interval,
the second spacer is spaced apart from the second pixel area by a third interval and from the third pixel area by a fourth interval, and
the third interval is greater than the first interval.

2. The display device of claim 1, wherein the first interval is greater than the second interval in a lower portion of the one of the first and second substrates.

3. The display device of claim 2, wherein the first interval increases from a central portion of the one of the first and second substrates to the lower portion in case the second interval is substantially the same from the central portion to the lower portion.

4. The display device of claim 1, wherein the second interval is greater than the first interval in an upper portion of the one of the first and second substrates.

5. The display device of claim 4, wherein the second interval increases from the central portion to the upper portion in case the first interval is substantially the same from the central portion to the lower portion.

6. The display device of claim 1, wherein the first interval is the same as the second interval in the central portion.

7. The display device of claim 6, wherein a sum of the first and second intervals is substantially the same in the central, upper, and lower portions.

8. The display device of claim 1, wherein the light shielding portion is a black matrix.

9. The display device of claim 1, wherein the spacer is disposed on one of the first and second substrates and protrudes toward another one of the first and second substrates that faces the spacer.

10. The display device of claim 9,
wherein each of the first and second spacers includes a main spacer disposed on the light shielding portion between the first pixel area and the second pixel area, and a sub spacer disposed on the light shielding portion between the first pixel area and the second pixel area;
wherein the main spacer is in contact with the first and second substrates that face the spacer and the sub spacer is spaced apart from the one of the first and second substrates.

11. The display device of claim 10, wherein the main spacer has a different height from the sub spacer.

12. The display device of claim 11, wherein the main spacer has a height lower than a height of the second spacer.

13. The display device of claim 10, wherein the main spacer has upper and lower surfaces greater than upper and lower surfaces of the sub spacer.

14. The display device of claim 13, wherein the upper and lower surfaces of the main and sub spacers have a circular shape.

15. The display device of claim 1, further comprising:
a pixel electrode disposed on the first substrate;
a common electrode disposed on one of the first and second substrates; and
a liquid crystal layer interposed between the first and second substrates.

16. The display device of claim 15, wherein a portion of the pixel electrode is disposed in the pixel area and another portion of the pixel electrode is disposed to overlap the light shielding portion.

17. The display device of claim 16, wherein the portion of the pixel electrode disposed in the pixel area is greater than the portion of the pixel electrode overlapping the light shielding portion.

18. The display device of claim 15, wherein at least a portion of the common electrode overlaps the pixel electrode.

19. The display device of claim 1, wherein the second intervals are substantially the same in the central, upper, and lower portions of the one of the first and second substrates.

20. The display device of claim 7, wherein the second interval is greater than the fourth interval.

* * * * *